United States Patent
Sun et al.

(10) Patent No.: US 12,465,061 B2
(45) Date of Patent: Nov. 11, 2025

(54) SYSTEM AND METHOD FOR PRESERVING RED MEAT BY PLASMA ACTIVE WATER (PAW) VACUUM PACKAGING

(71) Applicant: South China University of Technology, Guangdong (CN)

(72) Inventors: Dawen Sun, Guangdong (CN); Junhu Cheng, Guangdong (CN); Yaqi Chen, Guangdong (CN); Zhong Han, Guangdong (CN); Yijie Wang, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 605 days.

(21) Appl. No.: 17/760,550

(22) PCT Filed: Sep. 30, 2020

(86) PCT No.: PCT/CN2020/119251
§ 371 (c)(1),
(2) Date: Mar. 15, 2022

(87) PCT Pub. No.: WO2021/093483
PCT Pub. Date: May 20, 2021

(65) Prior Publication Data
US 2022/0369657 A1    Nov. 24, 2022

(30) Foreign Application Priority Data
Nov. 14, 2019  (CN) .......................... 201911111893.6

(51) Int. Cl.
*A23B 4/24*   (2006.01)
*A23B 4/027*  (2006.01)
(Continued)

(52) U.S. Cl.
CPC ............ *A23B 4/24* (2013.01); *A23B 4/027* (2013.01); *A23B 4/16* (2013.01); *A23B 4/305* (2013.01); *A23L 5/41* (2016.08); *B01J 19/088* (2013.01)

(58) Field of Classification Search
CPC .. A23B 4/24; A23B 4/027; A23B 4/16; A23B 4/305; A23B 4/015; A23B 4/09;
(Continued)

(56) References Cited

U.S. PATENT DOCUMENTS 10,645,940 B1 *   5/2020  Ding ...................... C02F 1/4608
2012/0301577 A1 * 11/2012 Baublits ................... A23B 4/20
                                                      426/652

FOREIGN PATENT DOCUMENTS

CN    101283832 A    10/2008
CN    107114458 A    9/2017
(Continued)

OTHER PUBLICATIONS

Zhao et al. Plasma-Activated Water Treatment of Fresh Beef: Bacterial Inactivation and Effects on Quality Attributes, First Published 2018 (see p. 1 paragraph under introduction for publication date information), IEE Transactions on Radiation and Plasma Medical Sciences, vol. 4, No. 1 (Year: 2018).*

(Continued)

*Primary Examiner* — Xiuyu Tai
(74) *Attorney, Agent, or Firm* — LOZA & LOZA, LLP; Michael Fedrick

(57) ABSTRACT

A system for preserving red meat by plasma active water (PAW) vacuum packaging includes a solution mixing tank, a plasma treatment chamber, an atomization spray module, a conveyor belt, a water circulation module, and a vacuum packaging module. The solution mixing tank, the plasma treatment chamber, the atomization spray module, and the (Continued)

water circulation module are sequentially connected through pipes. The atomization spray module is configured to spray PAW onto the red meat on the conveyor belt, and then the vacuum packaging module is configured to vacuum-package the red meat. Utilizing PAW improves the antibacterial ability of vacuum packaging while enhancing the color stability of red meat, greatly extending the shelf life of red meat, thereby preserving red meat in a green and economical way.

9 Claims, 2 Drawing Sheets

(51) Int. Cl.

| | |
|---|---|
| *A23B 4/16* | (2006.01) |
| *A23B 4/30* | (2006.01) |
| *A23L 5/41* | (2016.01) |
| *B01J 19/08* | (2006.01) |

(58) Field of Classification Search

CPC .... A23B 2/50; A23B 2/57; A23B 4/18; A23B 4/20; A23L 5/41; B01J 19/088; B01J 19/12; B01J 2219/0894; B01J 19/10; B01J 19/087; B01J 2219/083; B01J 2219/0884; B01J 2219/0877; B01J 2219/0809; C02F 1/4608; C02F 1/30; C02F 1/48; C02F 2103/08; C02F 2303/04; C02F 2001/46171; C02F 2305/023; C02F 2201/003; Y02A 40/90; Y02A 20/124; H05H 1/247

See application file for complete search history.

(56) References Cited

FOREIGN PATENT DOCUMENTS

| | | | |
|---|---|---|---|
| CN | 107156265 | A | 9/2017 |
| CN | 107616217 | A | 1/2018 |
| CN | 108391717 | A | 8/2018 |
| CN | 109077103 | A | 12/2018 |
| CN | 109757552 | A | 5/2019 |
| WO | 02062147 | A2 | 8/2002 |
| WO | 2016140447 | A1 | 9/2016 |
| WO | 2017070240 | A1 | 4/2017 |

OTHER PUBLICATIONS

Yong et al., “An innovative curing process with plasma-treated water for production of loin ham and for its quality and safety”, Plasma Processes and Polymers, 2018, pp. 1-9, vol. 15:2.

Zhang, “Fruits and Vegetables Preservation Equipment”, Post-Harvest Processing Machinery Equipment and Production Line Design for Fruits and Vegetables, 2017, pp. 47-48.

Jung et al., “Color Developing Capacity of Plasma-treated Water as a Source of Nitrite for Meat Curing”, Korean J. Food Sci. AN., 2015, pp. 703-706, vol. 35:5.

Yang et al., “Cold Plasma Technology and Its Effect on the Food Quality and Microorganism”, Food and Machinery, Sep. 30, 2019, pp. 199-203 and 215, vol. 35:9. (English language abstract).

Jung et al., “The use of atmospheric pressure plasma-treated water as a source of nitrite for emulsion-type sausage”, Meat Science, 2015, pp. 132-137, vol. 108.

* cited by examiner

SYSTEM AND METHOD FOR PRESERVING RED MEAT BY PLASMA ACTIVE WATER (PAW) VACUUM PACKAGING

CROSS-REFERENCE TO RELATED APPLICATIONS

This application is the United States national phase of International Application No. PCT/CN2020/119251 filed Sep. 30, 2020, and claims priority to Chinese Patent Application No. 201911111893.6 filed Nov. 14, 2019, the disclosures of each of which are hereby incorporated by reference in their entireties.

BACKGROUND OF THE INVENTION

Field of the Invention

The present invention relates to the field of food preservation, in particular to a system and method for preserving red meat by plasma active water (PAW) vacuum packaging.

Description of Related Art

Red meat is rich in iron and delicious in taste. It is one of the favorite meats of Chinese people. Red meat industry is an important contributor to the agricultural economy. Color is the most important quality parameter among those affecting the marketability of red meat, because consumers often take the fresh red color of meat as an indicator of health when buying. Discoloration of red meat for sale indicates that the red meat may have gone bad. Discolored meat is usually sold at a discount, or made into minced meat to be processed into low-value products. Meat with severe discoloration will be discarded. The above practices will lead to large economic losses. The biochemistry of myoglobin and the interaction of myoglobin with small biomolecules in the complex muscle food matrix control the color of red meat. These scientific principles must be used in modern agriculture, so as to take measures to improve the appearance and color stability of red meat in the "from farm to table" process of red meat to meet consumers' needs.

For keeping the fresh color of red meat for sale on the shelves, modified atmosphere packaging (MAP) is often used. The most common MAP systems are HIOX MAP (80% $O_2$+20% $CO_2$) and CO MAP (0.4% CO+20% to 30% $CO_2$, $N_2$ for balance). Although HIOX MAP can keep red meat fresh red during the shelf life, it may also accelerate lipid oxidation, resulting in peculiar smell of fresh red meat, thus shortening the shelf life. In addition, HIOX MAP may promote the protein oxidation and reduce the tenderness of red meat. In order to balance the color, taste and flavor, the concentration of $O_2$ in HIOX MAP must be accurately controlled. The small amount of CO in CO MAP is to combine red meat myoglobin with CO, so that the surface of red meat presents a stable cherry color. Although CO MAP can keep the red value of red meat stable throughout the shelf life in comparison with HIOX MAP, the use of CO and the need to ensure a low-oxygen environment in the entire package increase the packaging cost. Besides, once the red meat is taken out of the CO MAP, it will deteriorate rapidly in color after being repackaged in an aerobic environment. In general, MAP has high requirements for gas, a large space occupied by packaging, and a relatively short shelf life, which greatly increases the fresh-keeping cost of red meat.

Another packaging method with lower cost and longer preservation time is vacuum skin packaging in a vacuum packaging box. Vacuum packaging provides an oxygen-deficient environment, so it can inhibit the growth and reproduction of microorganisms and the oxidation of lipids and proteins for a long time. However, the color of red meat is dark purple that consumers do not like. The vacuum-packaged red meat with fresh red color will greatly increase consumers' desire to buy, having higher commercial value.

Plasma technology is a new type of non-thermal processing technology. Plasma is obtained by inputting energy to excite gas. The active components produced, such as reactive oxygen species (ROS) and reactive nitrogen species (RNS), have been proven to have significant bactericidal functions. PAW is water treated with plasma. When ROS and RNS enter the liquid phase from the gas phase, especially when RNS dissolves in water, considerable $NO^{2-}$ and $NO^{3-}$ ions will be generated. It is known that nitrite and nitrate are commonly used color retention agents for meat products, so PAW, as a source of $NO^{2-}$ and $NO^{3-}$, can be used for color retention of vacuum-packaged red meat. On the one hand, the reduction system of red meat will help reduce nitrite to NO, which then will combine with myoglobin to generate pink MbNO; on the other hand, $NO^{3-}$ can also help improve the stability of the red value of red meat. PAW, containing other active components such as $H_2O_2$, has excellent antibacterial ability, further improving the antibacterial ability of vacuum packaging. Based on the above advantages, it is feasible and effective to use the PAW surface treatment to improve the freshness of vacuum-packaged red meat.

SUMMARY OF THE INVENTION

In order to overcome the above deficiencies and shortcomings of the existing fresh-keeping technology, the present invention provides a system for preserving red meat by PAW vacuum packaging, which can effectively improve the fresh-keeping effect of vacuum-packaged red meat.

The present invention also provides a method for preserving red meat by PAW vacuum packaging, which makes the vacuum-packaged red meat maintain the original advantages as well as present a fresh red color and have effectively enhanced color stability.

The present invention adopts the following technical solution: A system for preserving red meat by PAW vacuum packaging is provided, comprising a solution mixing tank, a plasma treatment chamber, an atomization spray module, a conveyor belt, a water circulation module, and a vacuum packaging module; wherein the solution mixing tank, the plasma treatment chamber, the atomization spray module and the water circulation module are sequentially connected through pipes; and the red meat on the conveyor belt is sprayed by the atomization spray module, and then vacuum-packaged by the vacuum packaging module.

Preferably, the plasma treatment chamber, used to prepare PAW, is provided with a surface dielectric barrier discharge excitation device at the top and a stirring device at the bottom.

Preferably, the plasma treatment chamber comprises a plasma treatment tank, a stirring device at the bottom, a surface dielectric barrier discharge excitation device at the top, a porous mesh fiber layer, and a transformer; wherein the transformer is connected with the surface dielectric barrier discharge excitation device; the porous mesh fiber layer, arranged below the surface dielectric barrier discharge excitation device, makes the generated plasma uniformly contact a base solution; the stirring device at the bottom is used to stir the base solution, so that the upper and lower layers of the base solution constantly exchange positions with each other.

Preferably, the surface dielectric barrier discharge excitation device comprises a discharge electrode, a ground electrode, and a quartz dielectric plate; wherein the quartz dielectric plate is placed between the discharge electrode and the ground electrode to generate surface dielectric barrier discharge plasma.

Preferably, the ground electrode is a round block with a diameter of 3.0 mm.

Preferably, a pressure regulator is interposed among the pipes to control the flow and velocity of the liquid.

A method for preserving red meat by PAW vacuum packaging is provided, comprising the following steps:

S1. using the plasma treatment chamber to prepare PAW;
S2. cutting the red meat;
S3. spraying PAW uniformly on the surface of the red meat, with the weight ratio of the red meat to PAW at (60±10):1; and
S4. immediately vacuum-packaging the red meat sprayed with PAW, and then refrigerating or freezing the red meat for preservation.

Preferably, step S1 further comprises the following steps:
S11. preparing 0.02-0.06 mol/L sodium pyrophosphate solution as a base solution; and
S12. adjusting the treatment time of the plasma treatment chamber according to the treatment area of the plasma treatment chamber, the volume of the base solution, and the surface area, to finally obtain PAW (pH$\geqslant$6.0, $NO^{2-}$ concentration of 100 ppm, and $H_2O_2$ concentration of no more than 2 mmol/L).

Preferably, the plasma treatment chamber uses a voltage of 50-60 V and a frequency of 10 kHz, and directly utilizes air as a gas source for plasma excitation, adopting an indirect plasma treatment method.

Preferably, PAW may be freshly prepared, stored at room temperature for at most 48 h, or refrigerated at 4° C. for at most 2 weeks.

Compared with the prior art, the present invention has the following advantages and beneficial effects:

(1) Combining the plasma treatment chamber (used to prepare PAW), the atomization spray module and the vacuum packaging module, utilizing PAW that has the comprehensive characteristics of sterilization, antibacterium and containing a color retention factor ($NO^{2-}$ and $NO^{3-}$), the system for preserving red meat by PAW vacuum packaging of the present invention enhances the antibacterial ability of vacuum packaging while keeping the color of red meat, thereby preserving red meat in a green and economical way.

(2) The present invention does not need to prepare a large amount of mixed gases, and can generate plasma only by using atmospheric air for excitation in the plasma treatment chamber, thereby overcoming the disadvantages of the complicated gas distribution and high use threshold of the traditional MAP, having universal applicability.

(3) Prepared for use at any time, PAW used in the present invention takes a short time to get prepared, and directly enters the atomization spray module through a pipe to get sprayed quantitatively on the red meat on the conveyor belt; the unsprayed PAW is introduced into an active water collector, and then transported back to the atomization spray module by a vacuum pump, the process being simple, convenient and economical.

(4) PAW used in the present invention is prepared with a sodium pyrophosphate solution as the base solution, because the sodium pyrophosphate solution has the pH buffering capacity, which can ensure that $H_2O_2$ accumulates slow in concentration relative to $NO^{2-}$ and $NO^{3-}$, and will not promote the oxidation of lipids and proteins in red meat; PAW contains $NO^{2-}$ and $NO^{3-}$, both of which are effective color retention agents for red meat; moreover, PAW contains a small amount of hydrogen peroxide and other antibacterial components, which not only keep the color of red meat but also enhance the antibacterial ability of vacuum packaging, achieving color retention and antibacterial effect on red meat, thus greatly extending the shelf life.

(5) The present invention uses PAW to effectively improve the stability of the red value of ordinary vacuum-packaged red meat, and overcome the shortcomings of the dark color of single vacuum-packaged red meat, thereby increasing consumers' desire to buy and greatly reducing the waste of goods.

(6) Without requiring headspace packaging, the present invention finally only needs vacuum packaging for red meat, thus overcoming the disadvantages of large occupation space and inconvenient transportation and storage of the traditional MAP.

DETAILED DESCRIPTION

The present invention will be further described below in detail with reference to specific embodiments, but the embodiments of the present invention are not limited thereto.

Figure 1:
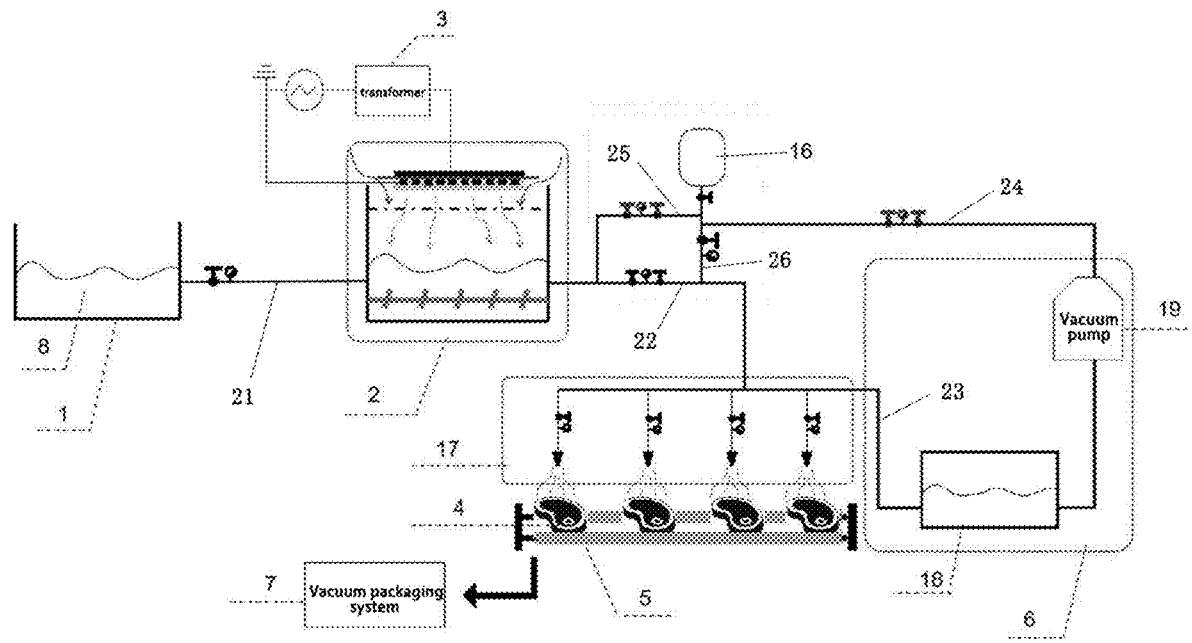
FIG. 1 shows the structure of the system for preserving red meat by PAW vacuum packaging in an example of the present invention.

As shown in FIG. 1, the system for preserving red meat by PAW vacuum packaging comprises a solution mixing tank 1, a plasma treatment chamber 2, an atomization spray module, a conveyor belt 5, a water circulation module 6, and a vacuum packaging module 7; wherein the solution mixing tank, the plasma treatment chamber, the atomization spray module and the water circulation module are sequentially connected through pipes; a pressure regulator 16 is interposed among the pipes to control the flow and velocity of the liquid; and the red meat 4 on the conveyor belt is sprayed by the atomization spray module, and then vacuum-packaged by the vacuum packaging module.

Figure 2:
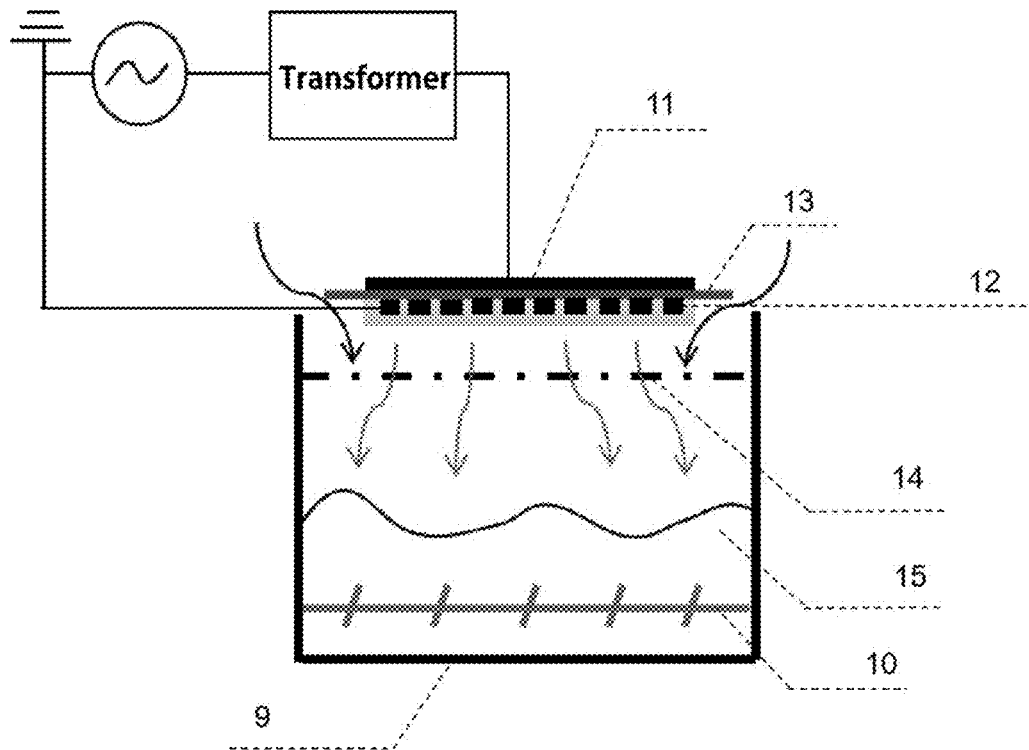
FIG. 2 shows the structure of the plasma treatment chamber in an example of the present invention.

The plasma treatment chamber, used to prepare PAW 15, is provided with a surface dielectric barrier discharge excitation device at the top and a stirring device at the bottom. Specifically, as shown in FIG. 2, the plasma treatment chamber comprises a transformer 3, a plasma treatment tank 9, a stirring device 10 at the bottom, and a surface dielectric barrier discharge excitation device at the top (the surface dielectric barrier discharge excitation device comprises a discharge electrode 11, a ground electrode 12 and a quartz dielectric plate 13, wherein a 1.0 mm thick quartz dielectric plate is placed between the discharge electrode and the ground electrode to generate surface dielectric barrier discharge plasma, and the ground electrode is a round block with a diameter of 3.0 mm). The transformer, connected with the surface dielectric barrier discharge excitation device of the plasma treatment chamber, is used for inputting an alternating current with a voltage of 220 V and a frequency of 50 Hz, and for outputting an alternating current with a voltage of 0-100 V and a frequency of 0.5-2.0 kHz, with the outputted current used for excitation to generate plasma. The present invention proposes to use an alternating current with a frequency of 10 kHz and a voltage of 50-60 V, and directly use air as the gas source for plasma excitation. The porous mesh fiber layer 14, arranged below the surface dielectric barrier discharge excitation device, makes the generated plasma uniformly contact the base solution. Besides, the stirring device at the bottom is used to stir the base solution, so that the upper and lower layers of the base solution constantly exchange positions with each other, ensuring the full contact of the base solution with the plasma, thereby improving the efficiency of preparing PAW.

The solution mixing tank is used to prepare or store the base solution of PAW. In this example, the base solution is a sodium pyrophosphate solution 8.

The atomization spray module comprises a pressure regulator 16 and an atomization spray device 17.

The water circulation module comprises an active water collector 18 and a vacuum pump 19.

The solution mixing tank 1 and the plasma treatment chamber 2 are connected through a first pipe 21, the plasma treatment chamber 2 and the atomization spray device 17 are connected through a second pipe 22, the atomization spray device 17 and the water circulation module 6 are connected through a third pipe 23. The pressure regulator 16 is connected to the water circulation module 6 through a fourth pipe 24 and connected to the second pipe 22 between the plasma treatment chamber 2 and the atomization spray device 17. The system further includes a fifth pipe 25 and a sixth pipe 26.

In this example, the control process of the system for preserving red meat by PAW vacuum packaging is as follows: A sodium pyrophosphate solution is prepared in the solution mixing tank that communicates with the plasma treatment chamber; the prepared sodium pyrophosphate solution continuously flows into the plasma treatment chamber through a pipe, which is provided with a pressure regulator to control the flow of the solution; with the solution mixing tank and the plasma treatment chamber in a high position, and the atomization spray module and the water circulation module in a low position, the porous mesh fiber layer in the plasma treatment chamber makes the plasma uniformly distributed, the treated sodium pyrophosphate solution (PAW) is introduced into the atomization spray module and sprayed onto the red meat on the conveyor belt (the appropriate transmission speed of the conveyor belt is set according to the weight ratio of red meat to PAW of (60±10):1), the pressure regulator controls the flow, and the excess PAW reenters the atomization spray module through the water circulation module; the sprayed red meat is transferred to the vacuum packaging module for vacuum packaging; finally, the packaged red meat is refrigerated or frozen.

Figure 3:
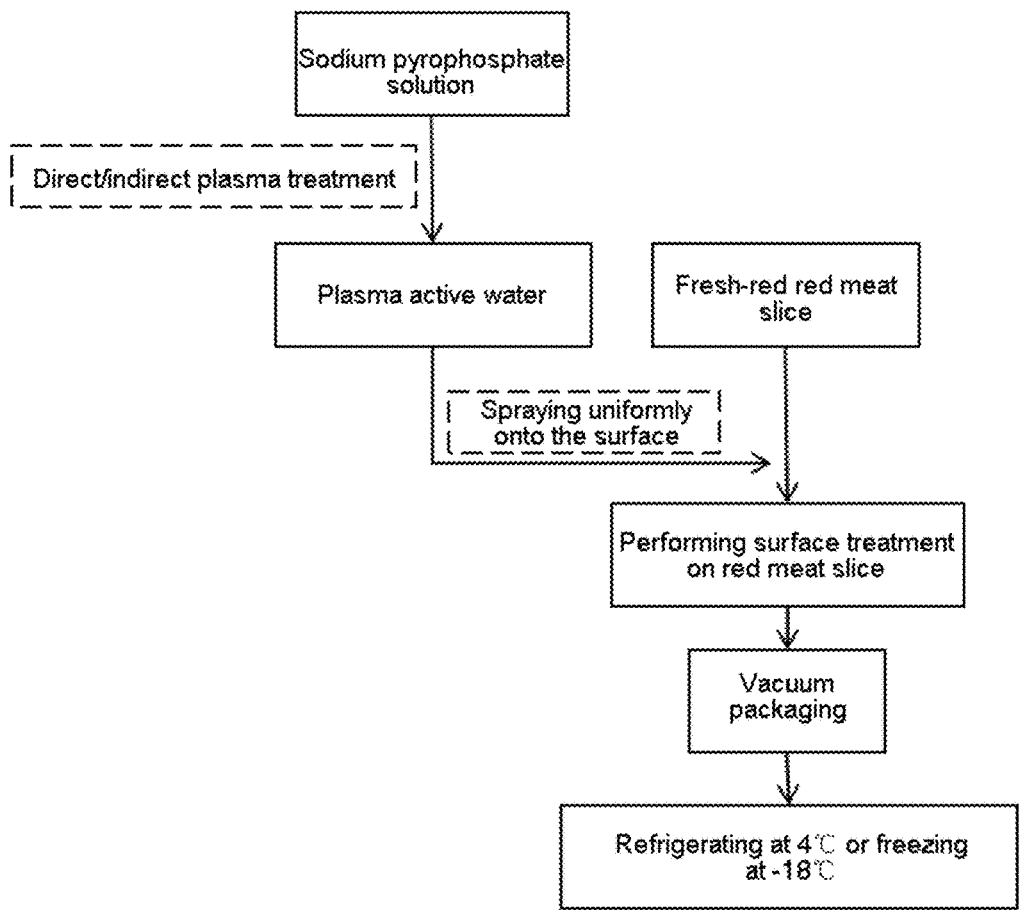
FIG. 3 is a flowchart of the method for preserving red meat by PAW vacuum packaging in an example of the present invention.

As shown in FIG. 3, a method for preserving red meat by PAW vacuum packaging comprises the following steps:

S1. using the plasma treatment chamber to prepare PAW, specifically as follows:
  first preparing 0.02-0.06 mol/L sodium pyrophosphate solution as a base solution; and
  then appropriately adjusting the treatment time according to the treatment area of the plasma treatment chamber (i.e. the area of the plasma region formed by the dielectric barrier discharge excitation device at the top of the plasma treatment chamber), the volume of the base solution to be treated, and the surface area, to finally obtain PAW (pH≥6.0, $NO^{2-}$ concentration of about 100 ppm, and $H_2O_2$ concentration of no more than 2 mmol/L);
  the plasma treatment chamber is a surface dielectric barrier discharge plasma treatment chamber with a voltage of 50-60 V and a frequency of 10 kHz, and directly utilizes air as a gas source for plasma excitation, adopting an indirect plasma treatment method;

S2. cutting the red meat;
red meat includes hot fresh meat, cold fresh meat, frozen thawed meat and minced meat of red meat; the hot fresh meat needs to be treated with PAW after acid discharge, while the cold fresh meat, frozen thawed meat and minced meat can be directly treated with PAW;

S3. spraying PAW uniformly on the surface of the red meat, with the weight ratio of the red meat to PAW at (60±10):1;
  PAW may be freshly prepared, stored at room temperature for at most 48 h, or refrigerated at 4° C. for at most 2 weeks, which do not affect their final color retention effect on red meat;

S4. immediately vacuum-packaging the red meat sprayed with PAW, and then refrigerating (1° C. to 4° C.) or freezing (−20° C. to −18° C.) the red meat for preservation.

The mechanism of the present invention is as follows: PAW contains $NO^{2-}$ and $NO^{3-}$, both of which are effective color retention agents for red meat; moreover, PAW contains a small amount of hydrogen peroxide and other antibacterial components, which not only keep the color of red meat but also enhance the antibacterial ability of vacuum packaging, achieving color retention and antibacterial effect on red meat, thus greatly extending the shelf life.

As shown in FIG. 2, the method for preserving red meat by PAW vacuum packaging in this example is specifically implemented as follows:

0.02 mol/L sodium pyrophosphate solution was prepared, and 1000 mL of the solution was introduced into the plasma treatment chamber; plasma was generated by surface dielectric barrier discharge excitation (voltage 60 V, frequency 10 kHz), and the introduced sodium pyrophosphate solution was indirectly treated for 30 min to finally obtain PAW (pH=9.11, $NO^{2-}$ 95.30 ppm, $NO^{3-}$ 239.21 ppm, and $H_2O_2$ 0.544 mmol/L) to meet the requirements of use.

The area of the plasma region formed by the dielectric barrier discharge excitation device at the top of the plasma treatment chamber was 40 cm², and the distance between the ground electrode and the surface of the liquid to be treated was 5 cm.

Twenty strips of untreated longissimus dorsi beef were purchased from the slaughterhouse and cut into 1 cm thick slices with a meat cutter; PAW was introduced into the atomization spray module and uniformly sprayed onto the surface of the beef on the conveyor belt.

The unsprayed PAW was introduced into an active water collector, and then transported back to the atomization spray module by a vacuum pump.

The beef sprayed with PAW entered the vacuum packaging module, and then the vacuum-packaged beef was refrigerated at 4° C.

Figure 4:
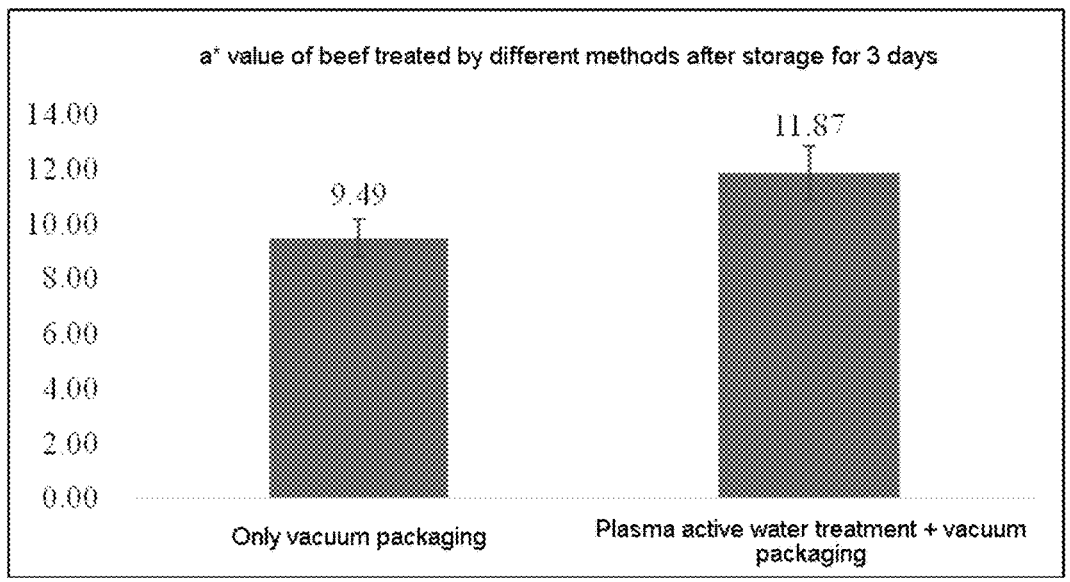
FIG. 4 shows the fresh-keeping effects of PAW on red meat in an example of the present invention for comparison.

At the same time, the beef that was only vacuum-packaged was prepared and refrigerated at 4° C. After 72 h, the color of the beef was inspected, with the results shown in FIG. 4. It was found that the redness (a* value) of the beef that was vacuum-packaged after PAW treatment was higher, while the redness (a* value) of the only vacuum-packaged beef was lower. This indicated that the present invention could effectively improve the color stability of vacuum-packaged red meat.

The above examples are preferred embodiments of the present invention, but the embodiments of the present invention are not limited thereto, and any other alterations, modifications, replacements, combinations and simplifications made without departing from the spirit and principle of the present invention shall all be equivalent substitutions and included in the scope of protection of the present invention.

The invention claimed is:

1. A system for preserving red meat by plasma active water (PAW) vacuum packaging, comprising:
    a solution mixing tank, a plasma treatment chamber, a pressure regulator, an atomization spray device, a conveyor belt, a water circulation module, and a vacuum packaging module,
    wherein the solution mixing tank and the plasma treatment chamber are connected through a first pipe, the plasma treatment chamber and the atomization spray device are connected through a second pipe, and the atomization spray device and the water circulation module are connected through a third pipe;
    wherein the atomization spray device is configured to spray the PAW onto the red meat on the conveyor belt, and the vacuum packaging module is configured to vacuum-package the red meat;
    wherein the solution mixing tank is configured to prepare or store a base solution, the base solution is configured to flow into the plasma treatment chamber through the first pipe, the plasma treatment chamber is configured for excitation to generate plasma, and the plasma is configured to contact the base solution to prepare the PAW in the plasma treatment chamber; and
    wherein the pressure regulator is connected to the water circulation module through a fourth pipe and is connected to the second pipe between the plasma treatment chamber and the atomization spray device, to control flow and velocity of the PAW within the second pipe into the atomization spray device.

2. The system for preserving red meat by PAW vacuum packaging according to claim 1, wherein the plasma treatment chamber, configured to prepare the PAW, comprises a surface dielectric barrier discharge excitation device at the top and a stirring device at the bottom.

3. The system for preserving red meat by PAW vacuum packaging according to claim 2, wherein the plasma treatment chamber further comprises
    a plasma treatment tank, the stirring device at the bottom of the plasma treatment tank, and the surface dielectric barrier discharge excitation device at the top of the plasma treatment tank,
    a transformer connected to the surface dielectric barrier discharge excitation device; and
    a porous mesh fiber layer arranged below the surface dielectric barrier discharge excitation device, wherein the porous mesh fiber layer is configured to make the generated plasma uniformly contact the base solution; and
    wherein the stirring device at the bottom of the plasma treatment tank is configured to stir the base solution such that upper and lower layers of the base solution constantly exchange positions with each other.

4. The system for preserving red meat by PAW vacuum packaging according to claim 3, wherein the surface dielectric barrier discharge excitation device comprises:
    a discharge electrode, a ground electrode, and a quartz dielectric plate;
    wherein the quartz dielectric plate is placed between the discharge electrode and the ground electrode to generate surface dielectric barrier discharge plasma.

5. The system for preserving red meat by PAW vacuum packaging according to claim 4, characterized in that: the ground electrode is a round block with a diameter of 3.0 mm.

6. A method for preserving red meat by PAW vacuum packaging using the system according to claim 1, comprising:
    preparing the PAW in the plasma treatment chamber;
    cutting the red meat;
    spraying the PAW uniformly on the surface of the red meat on the conveyor belt, with a weight ratio of the red meat to the PAW at (60±10):1; and
    immediately vacuum-packaging the red meat sprayed with the PAW, and then refrigerating or freezing the red meat for preservation.

7. The method for preserving red meat by PAW vacuum packaging according to claim 6, wherein using the plasma treatment chamber to prepare the PAW comprises:
    preparing 0.02-0.06 mol/L sodium pyrophosphate solution as the base solution; and
    adjusting the treatment time of the plasma treatment chamber according to the treatment area of the plasma treatment chamber, and the volume of the base solution, to obtain the PAW having a pH greater than or equal to 6.0, a $NO^{2-}$ concentration of 100 ppm, and a $H_2O_2$ concentration of no more than 2 mmol/L.

8. The method for preserving red meat by PAW vacuum packaging according to claim 7, wherein the plasma treatment chamber uses a voltage of 50-60 V and a frequency of 10 kHz, and wherein the plasma treatment chamber directly utilizes air as a gas source for plasma excitation, adopting an indirect plasma treatment method.

9. The method for preserving red meat by PAW vacuum packaging according to claim 6, wherein the PAW is freshly prepared, stored at room temperature for at most 48 h, or refrigerated at 4° C. for at most 2 weeks.

* * * * *